F. H. LINLEY.
CONDUIT.
APPLICATION FILED APR. 8, 1918.
1,325,024.
Patented Dec. 16, 1919.
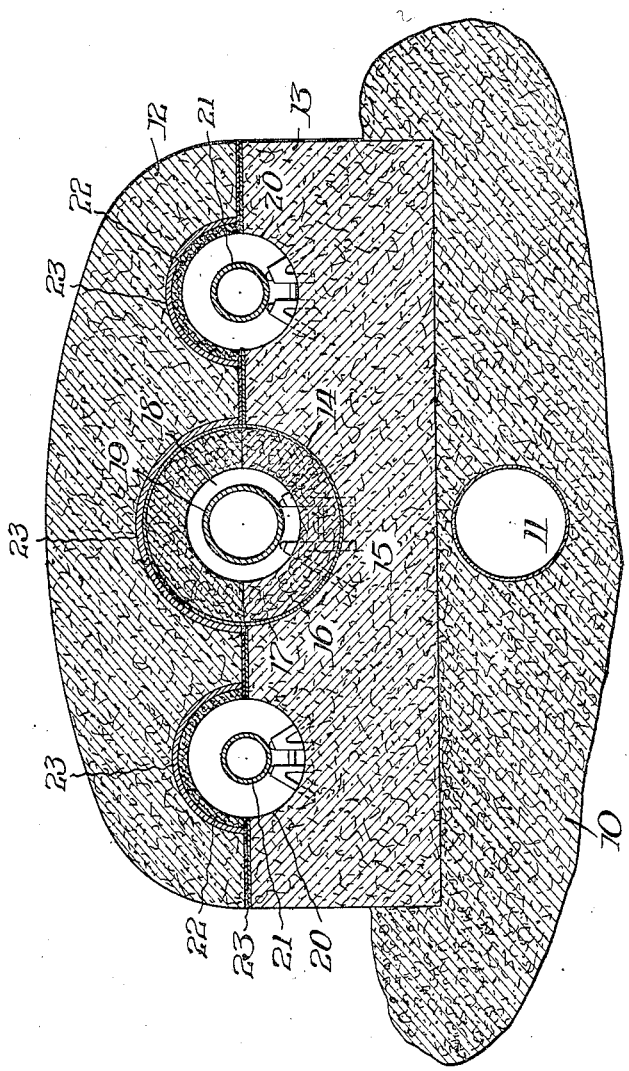

UNITED STATES PATENT OFFICE.

FRED H. LINLEY, OF DULUTH, MINNESOTA.

CONDUIT.

1,325,024.  Specification of Letters Patent.  Patented Dec. 16, 1919.

Application filed April 8, 1918. Serial No. 227,296.

*To all whom it may concern:*

Be it known that I, FRED H. LINLEY, a citizen of the United States, and resident of Duluth, in the county of St. Louis and State of Minnesota, have invented certain new and useful Improvements in Conduits, of which the following is a specification.

This invention relates to conduits or pipe coverings.

The object of this invention is to simplify and improve conduits or pipe coverings and the method of making the same.

The invention is illustrated on the accompanying sheet of drawing, showing my improved conduit in cross section.

In constructing the conduit in accordance with my invention, the bed or foundation 10 is prepared, the same being constructed preferably of cinders or crushed rock, in which is embedded or formed a drain 11 for carrying off surplus moisture. Upon the bed or foundation is constructed the waterproof conduit proper of plastic or concrete material, such conduit comprising upper and lower separable portions 12 and 13, respectively, and which preferably are formed separately. The lower part 13 of the conduit consists preferably of concrete placed upon the bed or foundation between suitable plates or boards. Referring first to the central construction, a longitudinal groove 14, preferably semi-circular in section, is formed in the upper surface of the lower half 13 by means of a form which is embedded in the concrete while still plastic. After the concrete has set, the form is removed. Pipe supports 15 are anchored in the concrete and extend into the longitudinal groove 14, these pipe supports preferably being mounted in pockets of known dimensions to insure the uniform projection of the supports into the longitudinal groove. In the event of the conduit being designed to contain pipes for conveying a heating medium, such as steam, hot water, or other heated fluid, the groove intended to receive such pipes is provided with a suitable lining for conserving the heat. This lining 16 may be of any suitable material and is divided longitudinally, one-half being disposed in the groove of the lower part 13 of the conduit, and the upper half being arranged to be embedded or molded in the upper half of the conduit.

After the lower half of the conduit is constructed, the groove 14 formed in the upper surface thereof receives the heat insulating lining 16 after the latter has been inclosed by a weather-proof lining 17 of any suitable material, either the kind of lining hereinabove referred to, or other protective covering. The inside diameter of the heat insulating lining 16 is sufficiently large to provide a space 18 between it and the pipe 19, which is mounted upon the pipe supports 15, and the function of which pipe is to convey a hot fluid.

The lower half 13 of the conduit may be provided with other longitudinal grooves 20 for the reception of other pipes 21, which may carry other fluids, and if these fluids are not such that require heat insulation, the latter is not provided. However, in this connection it will be noted that encircling the upper half of each of the pipes 21 is a semi-circular fiber covering 22 to form an upper protecting wall for said pipes 21. After all of the pipe coverings are set in place, the whole exposed upper surface of the lower portion 13 and the convex surface of the members 17 and 22 are provided with a layer of tar 23, or other material to form a separable joint, after which the upper portion 12 of the conduit is formed by pouring the concrete or other plastic material into place.

Only a relatively small amount of concrete, form work and skilled labor is required in connection with this construction. After the semi-cylindrical forms are made for forming the grooves, no form work is required in addition to planks to confine the concrete on both sides of the conduit. The construction lends itself to simple and accurate means for lining up the various elements, and a precise location of pipe supports insures the run of pipe being in line. The pipe is further prevented from being distorted, and since its expansion will be on a straight line, leaky joints are eliminated. The construction herein provided is water-tight. By withdrawing the upper portion 12 of the conduit at the tarred joint, the piping is accessible.

It is my intention to cover modifications of the invention falling within the spirit and scope of the following claims.

I claim:

1. The improvement in the art of producing, *in situ*, pipe conduits with removable covers, which consists in molding a base member of plastic material with the lower portion of the conduit impressed thereinto, applying to the exposed surfaces thus produced a substance for preventing the union of the base and cover members of the ultimate structure, then molding the cover member of the conduit upon the base member and over a conduit-form which protrudes above the base portion of the conduit correspondingly to the portion of the conduit to be produced in the cover member.

2. The improvement in the art of molding, *in situ*, conduits having removable covers, which consists in molding a base with the lower portion of the conduit impressed thereinto, introducing into said lower conduit portion a conduit form which protrudes above the base substantially to correspond with the portion of the conduit to be formed in the cover member, then applying to the exposed surfaces of the base and of said conduit form a substance which prevents the union of the cover and the base, and then molding the cover upon the base.

3. The improvement in the art of inclosing pipes in conduits, which consists in molding, *in situ*, from plastic material a conduit base member having impressed thereinto a lower conduit portion, lining said lower conduit portion with an insulator, introducing a pipe into the conduit portion thus produced and lined, applying a complementary lining member over the pipe and protruding above the base correspondingly to the conduit portion to be formed in the cover member, applying to the exposed surfaces of the base a substance that prevents union of the cover member with the base, and then molding the cover member upon the base and over the protruding portion of the conduit insulation.

Signed at Duluth, Minn., this 2nd day of April, A. D. 1918.

FRED H. LINLEY.